(12) United States Patent
Sorgato et al.

(10) Patent No.: US 12,459,179 B2
(45) Date of Patent: Nov. 4, 2025

(54) PREFORM MOLD COMPONENT

(71) Applicant: S.I.P.A. SOCIETA' INDUSTRIALIZZAZIONE PROGETTAZIONE E AUTOMAZIONE S.P.A, Vittorio Veneto (IT)

(72) Inventors: Marco Sorgato, Vigonza (IT); Giovanni Lucchetta, Schio (IT); Leonardo Orazi, Riccione (IT); Davide Masato, Arlington, MA (US); Federico Bessegato, Badoere di Morgano (IT); Andrea Cavalet, Ponte Nelle Alpi (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 17/422,418

(22) PCT Filed: Jan. 15, 2020

(86) PCT No.: PCT/IB2020/050305
§ 371 (c)(1),
(2) Date: Jul. 12, 2021

(87) PCT Pub. No.: WO2020/148673
PCT Pub. Date: Jul. 23, 2020

(65) Prior Publication Data
US 2022/0118665 A1    Apr. 21, 2022

(30) Foreign Application Priority Data
Jan. 16, 2019    (IT) .......................... 102019000000667

(51) Int. Cl.
*B29C 45/34* (2006.01)
*B29B 11/08* (2006.01)
(Continued)

(52) U.S. Cl.
CPC .............. *B29C 45/34* (2013.01); *B29B 11/08* (2013.01); *B29C 45/2618* (2013.01);
(Continued)

(58) Field of Classification Search
CPC ................................ B29B 11/08; B29C 45/34
See application file for complete search history.

(56) References Cited

U.S. PATENT DOCUMENTS

2006/0198974 A1* 9/2006 Miller .................. B29C 49/071
264/334
2013/0341814 A1* 12/2013 Witz ................... B29C 45/1753
425/546
(Continued)

FOREIGN PATENT DOCUMENTS

DE    2004094130 A1    11/2004
JP    H03199023 A      8/1991
(Continued)

OTHER PUBLICATIONS

Bekesi, J., et al. "Fast fabrication of super-hydrophobic surfaces on polypropylene by replication of short-pulse laser structured molds." Applied Physics A 99 (May 7, 2010): 691-695. (Year: 2010).*
(Continued)

*Primary Examiner* — Benjamin A Schiffman
(74) *Attorney, Agent, or Firm* — Troutman Pepper Locke LLP

(57) ABSTRACT

A component of a mold for molding preforms made of thermoplastic material, comprising
at least a first part (10) and at least a second part (20) adapted to mold part of the outer surface of a preform,
(Continued)

wherein, when the first part (10) and the second part (20) are assembled to each other, at least a first surface (11) of the first part (10) and at least a second surface (21) of the second part (20) face each other and are spaced apart from each other, thus delimiting a passageway for gases or vapors to leave the mold;

and wherein at least one of said first surface (11) and said second surface (21) comprises laser-induced periodic surface structures (LIPSSs).

10 Claims, 7 Drawing Sheets

(51) Int. Cl.
```
B29C 45/26      (2006.01)
B29C 45/33      (2006.01)
B29C 33/38      (2006.01)
B29C 45/00      (2006.01)
B29C 45/44      (2006.01)
B29K 105/00     (2006.01)
```

(52) U.S. Cl.
CPC ............ *B29C 45/263* (2013.01); *B29C 45/33* (2013.01); *B29C 33/3842* (2013.01); *B29C 2045/0034* (2013.01); *B29C 45/44* (2013.01); *B29K 2105/258* (2013.01)

(56) References Cited

U.S. PATENT DOCUMENTS

2016/0318267 A1† 11/2016 Koiso
2018/0117797 A1   5/2018 Shin et al.
2019/0375134 A1* 12/2019 Bradshaw ............... B29B 11/14

FOREIGN PATENT DOCUMENTS

| JP | 08-117956    | † | 5/1996  |
|----|--------------|---|---------|
| JP | H1190609 A   |   | 4/1999  |
| JP | 2000317946 A |   | 11/2000 |
| JP | 2010/047322 A1 |  | 4/2010 |
| WO | 2012/045171 A1 |  | 4/2012 |
| WO | 2017065803 A1 |  | 4/2017 |
| WO | 2018/107273 A1 |  | 6/2018 |

OTHER PUBLICATIONS

Wu, P. H., et al. "Fabrication of large-area hydrophobic surfaces with femtosecond-laser-structured molds." Journal of Micromechanics and Microengineering 21.11 (Oct. 20, 2011): 115032. (Year: 2011).*

Orazi, Leonardo, et al. "Nonlinear laser lithography to control surface properties of stainless steel." Cirp Annals 64.1 (Jun. 4, 2015): 193-196. (Year: 2015).*

Kobayashi, Tomoki, et al. "Surface flattening and nanostructuring of steel by picosecond pulsed laser irradiation." Nanomanufacturing and Metrology 1 (Sep. 5, 2018): 217-224. (Year: 2018).*

Sorgato, Marco, et al. "Submicron laser-textured vents for self-cleaning injection molds." Journal of Applied Polymer Science 137.42 (Mar. 31, 2020): 49280. (Year: 2020).*

Simoes, J. G. A. B., R. Riva, and W. Miyakawa. "High-speed Laser-Induced Periodic Surface Structures (LIPSS) generation on stainless steel surface using a nanosecond pulsed laser." Surface and Coatings Technology 344 (2018):423-432.

International Search Report, dated Apr. 5, 2020, for corresponding International Patent Application No. PCT/IB2020/050305.

Known Common Knowledge Evidence 1: "Laser Irradiation Effect of Semiconductor Material and Device", Qisheng Lu, et al., pp. 247-250, National Defense Industry Press, Dec. 2015.

International Search Report for PCT/IB2019/055292, dated Oct. 18, 2019.

Frank A. Muller, et al., Bio-Inspired Functional Surfaces Based on Laser-Induced Periodic Surface Structures, pp. 1-29, Jun. 15, 2016, MDPI—Materials (ISSN 1996-1944).†

M.Sorgato et al., Effect of different laser-induced periodic surface structures on polymer slip in PET injection moulding, May 3, 2018, vol. 67, Issue 1, pp. 575-578.†

\* cited by examiner
† cited by third party

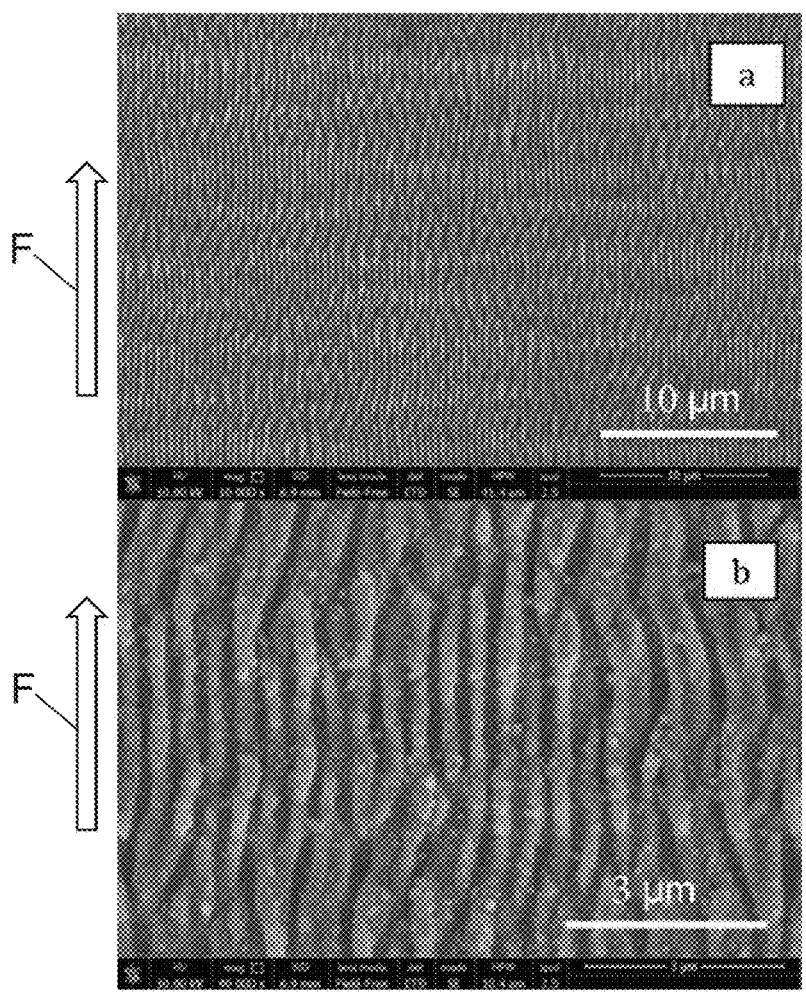
Fig. 7A
Fig. 7B
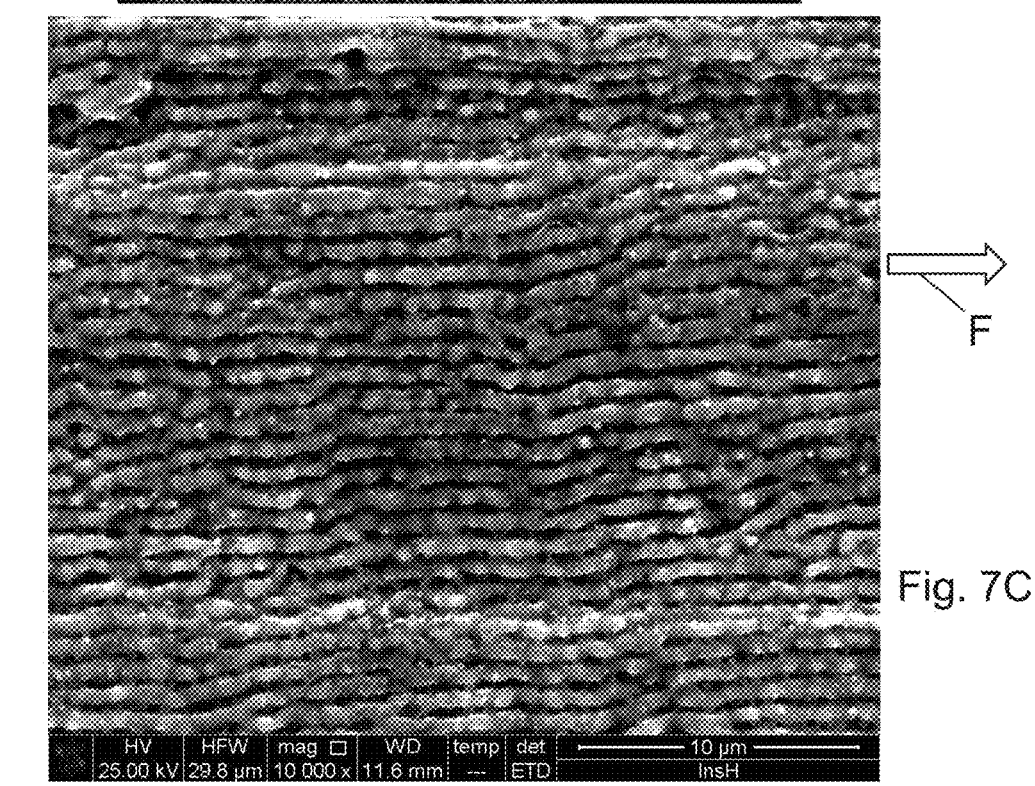
Fig. 7C

PREFORM MOLD COMPONENT

CROSS REFERENCE TO RELATED APPLICATIONS

This application is a national phase of PCT application No. PCT/IB2020/050305, filed Jan. 15, 2020, which claims priority to IT patent application No. 102019000000667, filed Jan. 16, 2019, all of which are incorporated herein by reference thereto.

FIELD OF THE INVENTION

The present invention relates to the field of molding preforms for containers made of thermoplastic material, for example preforms for PET bottles.

The present invention particularly relates to the components of a mold for injection or injection-compression molding of such preforms.

In greater detail, the invention relates to the superficial features of the surfaces which delimit the vent passageways between the mold components.

BACKGROUND ART

The preforms of bottles made of thermoplastic material typically are manufactured by means of an injection molding or injection-compression molding process.

In such processes, a given quantity of melted thermoplastic polymeric material is injected at a high pressure into a mold, which imparts the shape of the preform.

In particular, a mold for injection or injection-compression molding comprises certain components which form a molding cavity, defining the outer surface of the preform.

During the injection, the air in the cavity is pushed by the melted polymer which enters the mold. The melted polymer increases the temperature and the air pressure for the whole duration of the filling step. Simultaneously, there is the formation of condensation caused by the cooling of the mold, and volatile components are generated due to the degradation of the injected polymeric material.

These products may accumulate on the surfaces of the mold, thus compromising the process, the quality of the molded item and the functionality of the mold.

To obviate the problem, the molds are provided with vents, i.e. passageways for gases or vapors to leave, provided between one or more components of the mold. During the injection molding process, such vents tend to get dirty over time, whereby the gases are obstructed from leaving.

In greater detail, the thermal gradient between polymer and mold surface usually is high so as to reduce the cycle time and increase the process productivity. Keeping the surfaces of the molds at low temperatures however results in the formation of condensation on the cold surfaces of the mold. Moreover, volatile components are formed from the melted plastic material, in particular from the PET (polyethylene terephthalate), such as water vapor and carbon monoxide ($CO_2$), cyclic aldehydes and oligomers resulting from the degradation of the polymer chains.

These products may quickly condensate and be deposited on the cold surfaces delimiting the vents, thus dirtying and obstructing them.

In the case of injection molding preforms, the vents are in general passageways obtained between the coupling surfaces between the parts forming the mold. The thickness, i.e. the passageway gap, of the vents is in the range of a few hundredths of a millimeter in order to prevent the generation of overfill on the molded component and material leaving the mold cavity in the injection step.

The phenomenon of the accumulation of dirt on the walls of the vents is not immediate, rather worsens slowly, resulting in the progressive obstruction of the vent passageways after thousands or tens of thousands of working cycles, which in most cases means a period between a few days and a week.

An incorrect and failed evacuation of the gases from the molding cavity may result in a large number of defects of the molded parts, such as for example, the generation of overfill, deformities in the final dimensions of the manufactured product and the appearance of aesthetical imperfections.

The trapping of the gases in the cavity due to the obstruction of the vents in the long run may induce the damage of the molding surfaces of the mold components.

In industrial practice, there is a need to stop the production process and clean the vents by means of manual operations. Within the context of the injection molding of preforms, which is marked by increased productivity, low cycle time and broad life span for the mold, operations of this type, in addition to the scheduled maintenance of the mold, result in a significant increase in costs.

Therefore, the need is felt to overcome the drawbacks owing to the obstruction or reduction in section of the vent passageways.

SUMMARY OF THE INVENTION

It is an object of the present invention to minimize the deposit of material on at least one surface which delimits at least one vent passageway of a component of a preform mold.

It is another object of the present invention to provide a component of a mold which allows the productivity of the preform production process to be increased.

The present invention achieves at least one of such objects, and other objects which will become apparent in light of the present description, by means of a component of a mold for molding preforms made of thermoplastic material, comprising at least a first part and at least a second part adapted to mold part of the outer surface of a preform, wherein when the first part and the second part are assembled to each other, at least one first surface of the first part and at least one second surface of the second part face each other and are spaced apart from each other, thus delimiting a first passage for gases or vapors to leave the mold; and wherein at least one of said first surface and said second surface comprises laser-induced periodic surface structures (LIPSSs).

Said laser-induced periodic surface structures (LIPSSs) preferably comprise or consist of a plurality of crests and a plurality of channels. The LIPSSs may also have another shape. For example, the LIPSSs may comprise or consists of a plurality of pillars, or comprise or consist of a plurality of scales, or comprise or consist of two or more, for example two or three, of the shapes mentioned above, i.e. crests, pillars and scales.

When the LIPSSs comprise or consist of said crests and said channels, the LIPSSs are also referred to as ripples.

In particular, the LIPSSs preferably consist of a plurality of crests alternated with a plurality of channels (or troughs), or in other terms, the crests and channels are alternated with one another. Each channel is preferably defined between two crests.

The crests and channels advantageously decrease the wettability of the surface.

The inventors have discovered that advantageously there is a substantially linear correlation between the values of static contact angle 8 (indicative of the wettability of the surface) and the quantity of material which is deposited on the surface.

In particular, it has been noted that more hydrophobic surfaces (provided with LIPSSs, for example provided with crests and troughs) tend to get less dirty. Preferably, the values of static contact angle of the surfaces provided with LIPSSs, with crests and channels in particular, are of at least 70°, preferably of at least 90°, for example between 70° and 150°, or between 70° and 130°, or between 90° and 150°, or between 90° and 130°, or between 70° and 90°, or between 130° and 150°. Since the surfaces get less dirty, the production stops for performing the cleaning on such surfaces advantageously are much less frequent with respect to the prior art.

The plurality of crests and the plurality of channels are preferably substantially oriented in the same direction.

In particular, the crests are longitudinal projections which substantially, or mainly, extend parallel to one another.

Preferably, such a direction is substantially transverse, preferably substantially orthogonal, to the axis about which the molding surface of the component extends, i.e. the surface intended to come into contact with the thermoplastic polymer material and which gives the outer shape to the preform. With reference to the preform molded in the mold, said axis substantially is the middle axis of the preform which passes through the opening of the neck of the preform.

The best results in terms of reduction of quantity of dirt deposited on the surface are obtained when such a direction is substantially orthogonal to said axis, for example when such a direction is substantially radial with respect to said axis.

Thereby, said direction is substantially parallel to the flow of gases leaving the mold, in particular to the flow of gases pushed by the polymer during the injection step.

The surfaces on which the crests and channels are present are preferably ground before making the LIPSSs, e.g. of the crests and channels.

The grinding direction is preferably substantially parallel to the orientation direction of the crests and of the channels.

Both the grinding direction and the orientation direction of the crests and of the channels are preferably substantially orthogonal to the axis about which the molding surface of the component extends.

When the grinding direction, the orientation direction of the crests and channels, and the flow direction are substantially parallel to one another, it has been experimentally noted that about 30% less material is deposited on the surface with respect to a surface which is only ground parallel to the direction of the gas flow.

The laser-induced periodic surface structures (LIPSSs) are preferably substantially linear, i.e. substantially rectilinear, or wavy, in particular along the orientation direction thereof.

In the present description, the terms "substantially" and "mainly" are used with reference to certain features of the LIPSSs.

The use of such terms is justified by reasons associated with the production technology of such structures, which the skilled expert is capable of understanding.

Such LIPSSs are preferably, but not exclusively, obtained by means of a process referred to as nonlinear laser lithography (NLL), in particular with pulsating laser sources with pulses preferably lasting in the order of femtosecond or picosecond.

This process allows production rates of different hundreds of square millimeters per minute to be obtained, which are very high with respect to other treatments on a nanometric scale and suitable for industrial applications. Moreover, this process allows surface structures to be obtained having smaller dimensions than the focus radius of the laser itself.

The part comprising the surface on which the LIPSSs are to be provided is preferably arranged on a moving table adapted to move with respect to a head from which a laser beam leaves. Means for focusing the laser beam are preferably provided upstream of the head. The laser beam is deflected by means of a deflector. The laser beam forms a spot and hits the surface, thus generating the LIPSSs.

For example, the laser source may be of the "Coherent HyperRapid NX" type, operating at a fundamental mode at 1064 nm with pulse duration of about 8 ps. The deflector may be a "Raylase Focusshifter CS" scanner for example, provided with a lens with 160 mm focal length.

According to another aspect, the invention comprises a process comprising at least the step of irradiating at least one surface of at least one part of the component by means of a laser beam emitted by a laser source to produce said laser-induced periodic surface structures (LIPSSs).

Ultrashort laser pulses are preferably used in the process, for example pulses having a duration between 1 and 10 ps, preferably between 7 and 9 ps, for example about 8 ps, the end values of said ranges being preferably included.

The surface on which the LIPSSs are to be provided, for example the crests and channels, first is preferably ground and then irradiated. The grinding direction and the orientation direction of the crests and channels are preferably substantially parallel to one another.

The invention also relates to a mold according to claim 10.

Further features and advantages of the invention will become more apparent in light of the detailed description of non-exclusive embodiments.

The dependent claims describe particular embodiments of the invention.

BRIEF DESCRIPTION OF THE DRAWINGS

In the description of the invention, reference is made to the accompanying drawings, which are provided by way of a non-limiting example, in which:

FIG. 7A shows an image of an example of LIPSSs obtained by means of a scanning electron microscope (SEM);

FIG. 7B shows an enlargement of FIG. 7A;

FIG. 7C shows an image of another example of LIPSSs obtained by means of a scanning electron microscope (SEM).

The same elements or components have the same reference numeral.

DESCRIPTION OF EMBODIMENTS OF THE INVENTION

Figure 1:
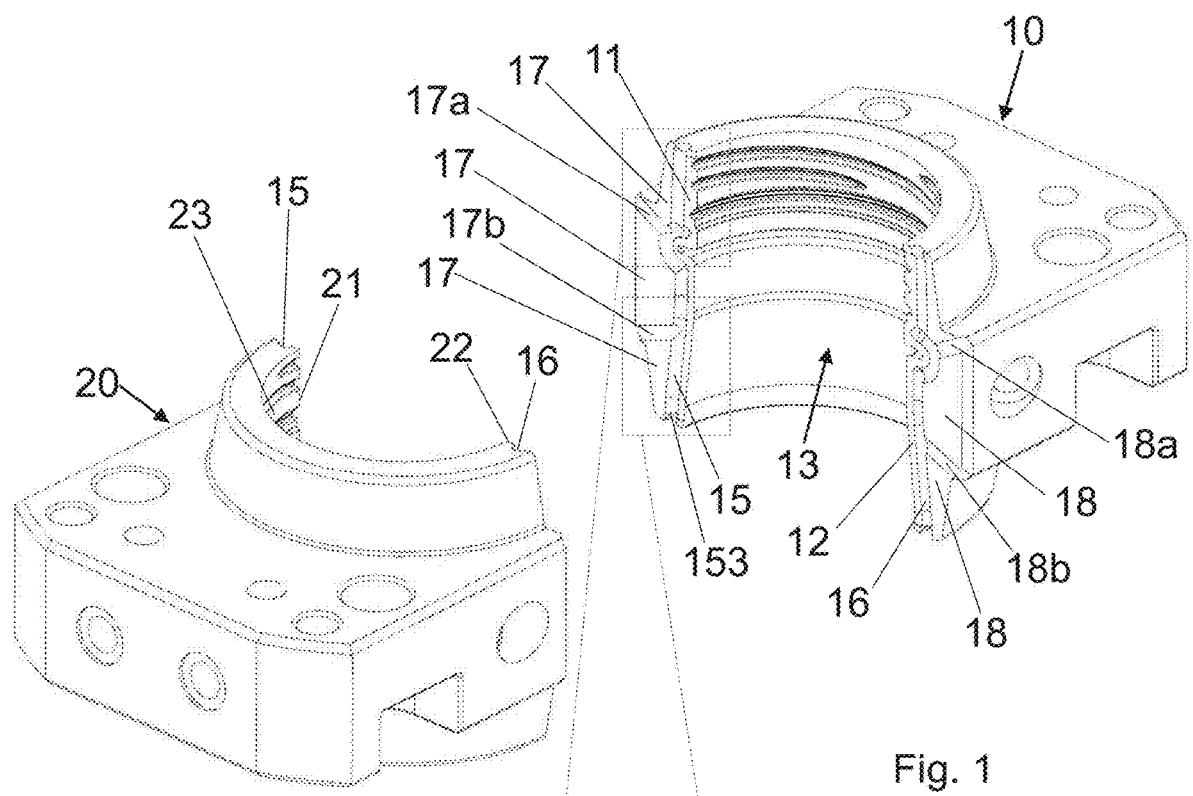
FIG. 1 shows a perspective view of two parts of a component of a mold according to the invention.

A component of a mold for molding preforms made of thermoplastic material (e.g. PET) according to the invention comprises a part 10 and a part 20 adapted to mold part of the outer surface of a preform, wherein when part 10 and part 20 are assembled to each other, at least one surface 11 of part 10 and at least one surface 21 of part 20 face each other and are spaced apart from each other, thus delimiting a passageway for gases or vapors to leave the mold;

and wherein at least one of said surface 11 and said surface 21 comprises laser-induced periodic surface structures (LIPSSs), in particular a plurality of crests 101 and a plurality of channels 102 (FIGS. 5 to 7C).

The component, including the parts 10, 20 thereof, is preferably made of a metal material or metal alloy adapted to injection molding, for example made of steel.

Preferably, the aforesaid component is the component referred to as "neck mold" or "neck ring" or "neck insert". This component is configured to mold the outer surface of the neck of the preform (the latter not illustrated). In particular, the neck mold comprises a molding surface 13, 23 which is intended to come into contact with the thermoplastic material to mold the outer surface of the neck of the preform, including the threaded portion, when provided.

The molding of the neck comprises the two parts 10, 20, which can be assembled to and disassembled from each other. In order to mold the preform, part 10 and part 20 are assembled to each other. Each part 10, 20 is provided with a respective molding surface 13, 23. When part 10 and part 20 are assembled to each other, the molding surfaces 13, 23 substantially extend about an axis X.

Part 10 and part 20 are preferably substantially similar or equal to each other, apart from the portion of molding surface 13, 23 which serves to mold the threading (when provided) of the preform, which may be positioned in different manner in the two parts 10, 20, as the skilled expert may understand.

The molding surface 13 of the part 10 has two end sides from which a respective surface 11, 12 extends. Preferably, surface 11 and surface 12 are opposite to each other with respect axis X. The surfaces 11, 12 preferably form a corner with the molding surface 13. The surfaces 11, 12 are not intended to come into contact with the thermoplastic material. In other words, the possible deposit of thermoplastic material on the surfaces 11, 12 is undesired. The outline of surface 11 and surface 12 which is close to the molding surface 13 preferably comprises a bight 111c at the portion which molds the support ring of the preform, and a series of bights 111d at the threading (when provided) of the preform. Part 20 comprises surfaces 21, 22 similar to surfaces 11, 12.

Figures 1A, 1B:
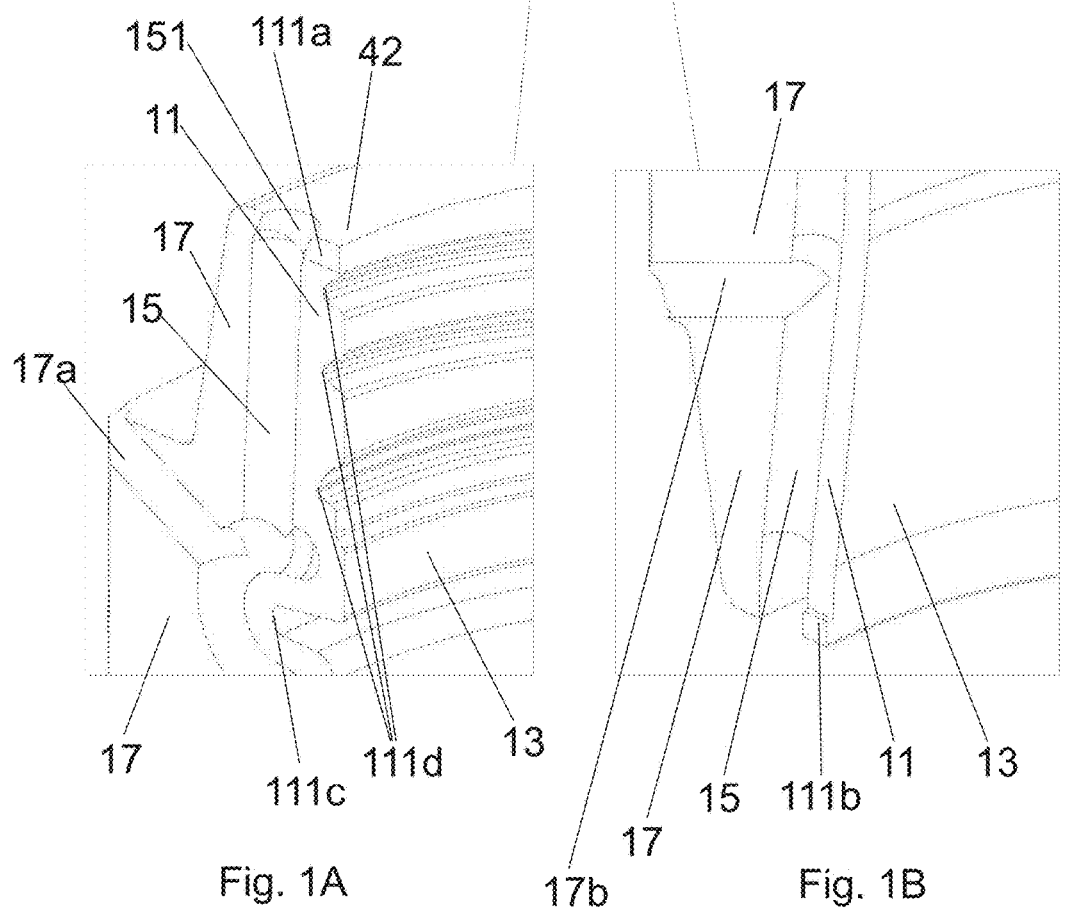
FIG. 1A shows an enlarged detail of FIG. 1.
FIG. 1B shows another enlarged detail of FIG. 1.
Figure 2:
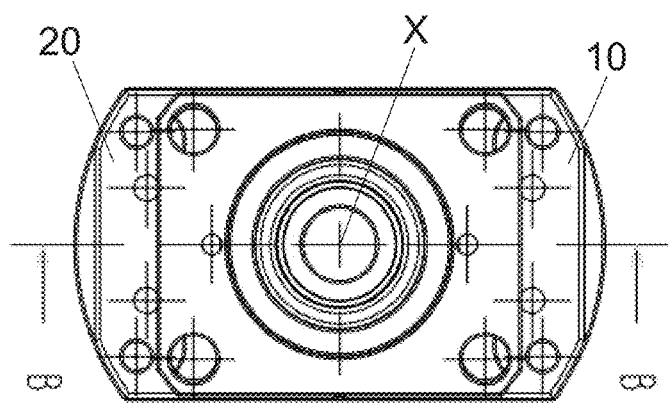
FIG. 2 shows a top view of certain parts of a mold according to the invention.
Figure 3:
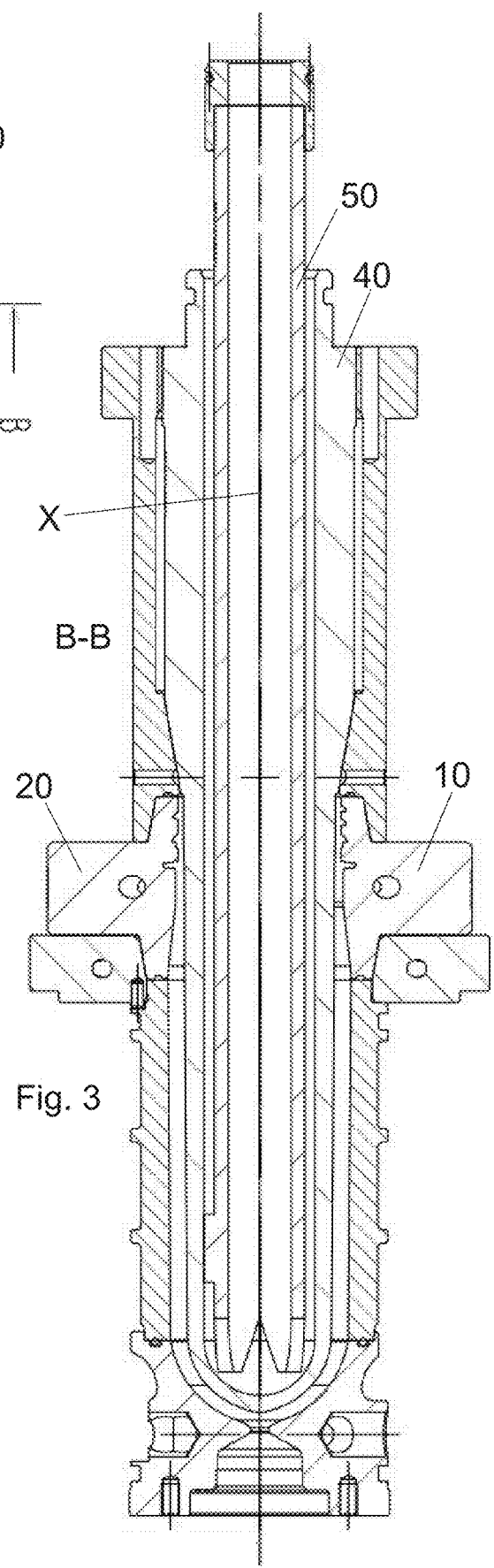
FIG. 3 shows section B-B of FIG. 2.

As noted in FIGS. 1A and 1B, a projection 111a, 111b preferably extends from each end, in particular from each axial end, of surface 11 and similarly, from surface 12. The projections 111a, 111b have a much smaller extension, parallel to axis X, with respect to the extension of surface 11, 12 parallel to axis X.

A recessed surface 15 (or recess), in particular recessed with respect to surface 11, is provided adjacent to surface 11. Similarly, a recessed surface 16 is provided adjacent to surface 12.

The recessed surface 15, 16 is preferably placed by the side of surface 11, 12 substantially over the whole extension thereof along axis X.

Preferably, the recessed surface 15, 16 is concave towards a similar surface of part 20. Preferably, the difference in level between surface 11, 12 and the maximum depth of the recessed surface 15, 16 is between 0.5 and 2 mm.

The recessed surfaces 15, 16 preferably extend up to the upper surface and the lower surface of part 10, whereby such upper and lower surfaces each have a bight 151, 153 at each recessed surface 15, 16.

An abutment surface 17 adapted to come into contact with a corresponding abutment surface of part 20, is provided adjacent to the recessed surface 15.

Similarly, an abutment surface 18 adapted to come into contact with a corresponding abutment surface of part 20, is provided adjacent to the recessed surface 16.

There is a difference in level, preferably between 0.01 and 0.1 mm, between the abutment surface 17 and surface 11, and between the abutment surface 18 and surface 12.

The abutment surface 17 comprises one or more recesses, for example two recesses 17a, 17b, which in particular branch off transversely from the recessed surface 15. Similarly, the abutment surface 18 comprises one or more recesses, for example two recesses 18a, 18b, which in particular branch off transversely from the recessed surface 16. The recesses 17a, 17b, 18a, 18b also are portions of recessed surfaces.

When part 10 and part 20 are assembled to each other, the result is:
  each abutment surface 17, 18 of part 10 abuts with a respective abutment surface of part 20;
  each surface 11, 12 of part 10 faces, and is spaced apart from, a respective surface 21, 22 of part 20 so that each pair of surfaces, i.e. pair 11, 21 and pair 12, 22, delimits a passageway or channel, i.e. a gap, for the gases or vapors to leave the mold;
  each recessed surface 15, 16 of part 10 faces, and is spaced apart from, a respective recessed surface 15, 16 of part 20;
  each recess 17a, 17b, 18a, 18b of the first part 10 faces, and is spaced apart, a respective recess (not shown in the drawings) of part 20. In particular, the recesses 17a, 17b, 18a, 18b serve to put the surfaces 15, 16 into communication with the atmosphere, or more in general, with the inside of the mold of the neck.

Figure 4:
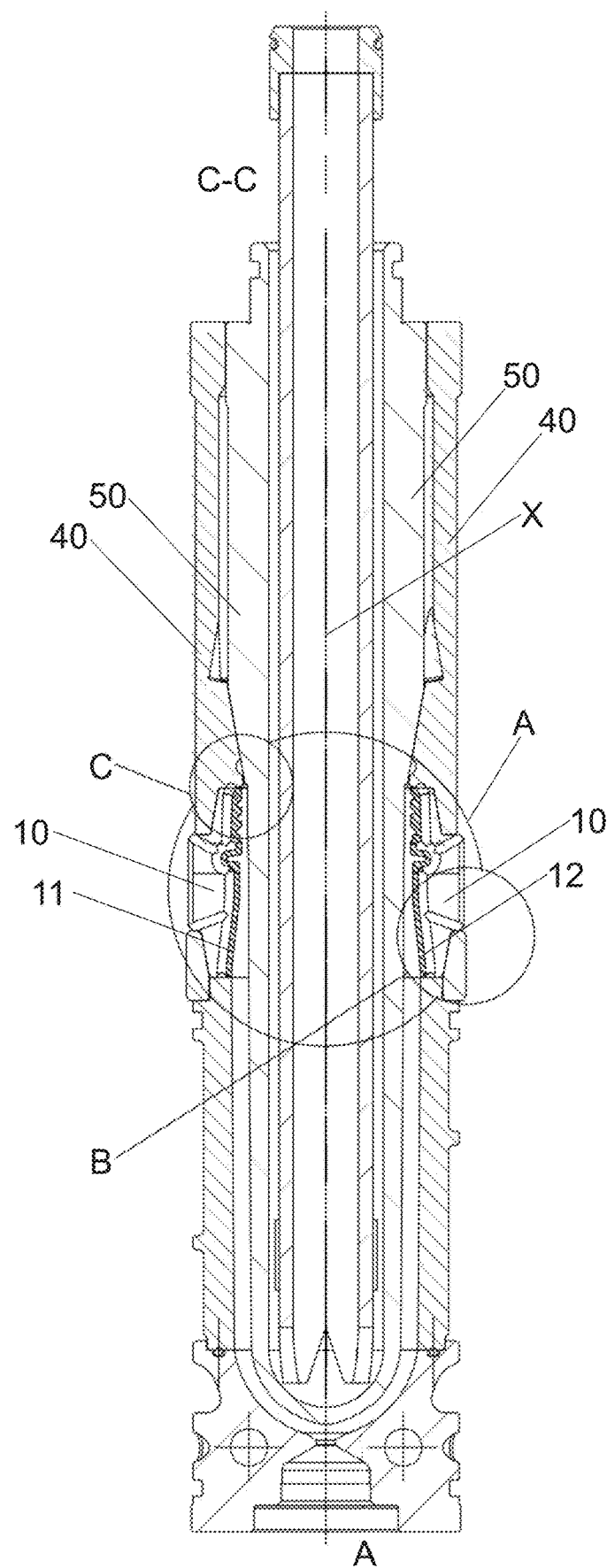
FIG. 4 shows section C-C of FIG. 3.
Figure 4A:
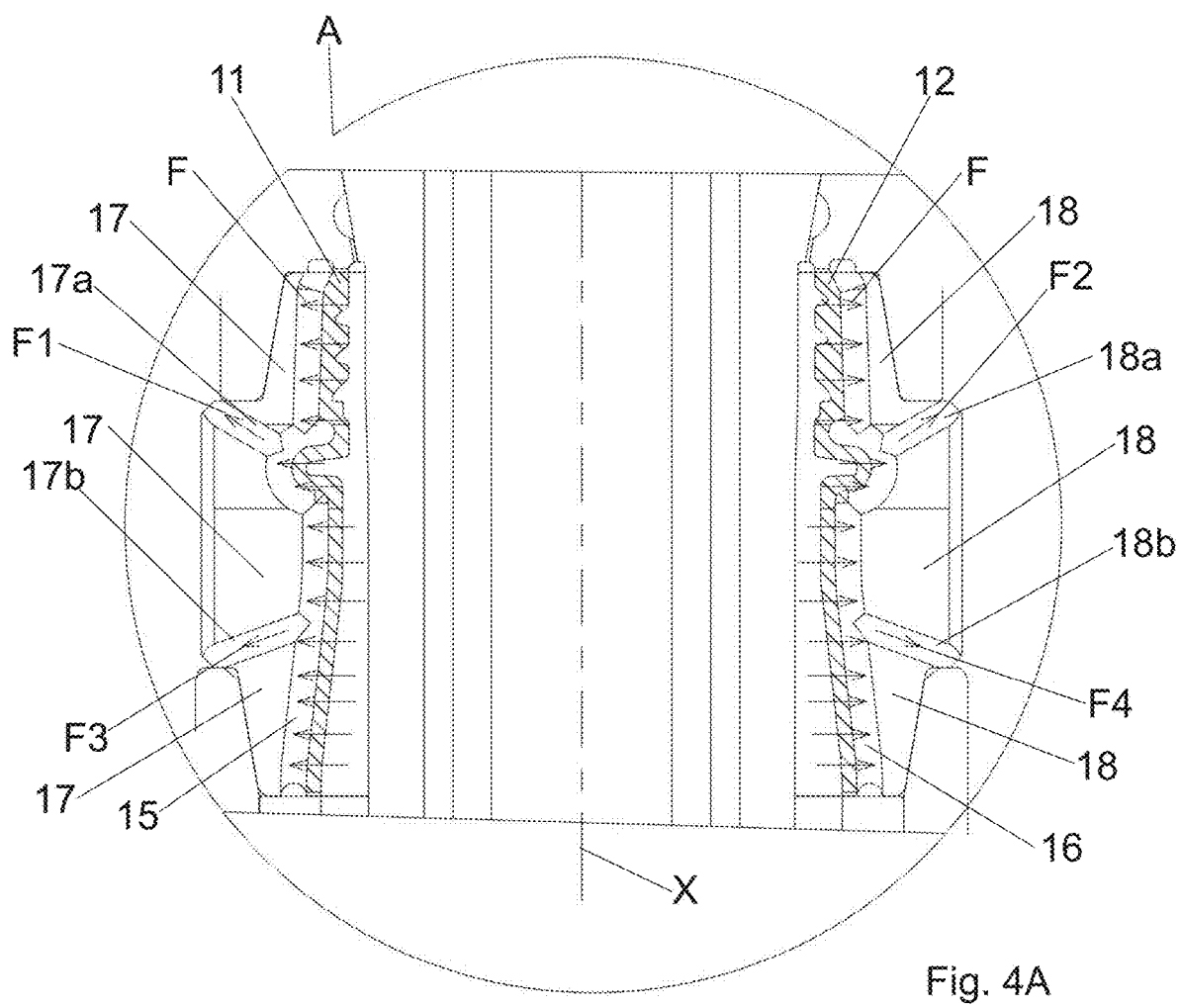
FIG. 4A shows an enlarged detail of FIG. 4.

Thus, with particular reference to FIG. 4A, there can be a passage of gases or vapors which passes through the passageway delimited by the pairs of surfaces 11, 21 and 12, 22 (arrows F). The flow of gases or vapors is then channeled into the channel system formed by the recesses 15, 16 and the recesses 17a, 17b, 18a, 18b of the two parts 10, 20. The flow of gases or vapors leaves from the channels formed by the recesses 17a and 17b of the two parts 10, 20 and from the channels 18a, 18b of the two parts 10, 20, to the outside of the mold of the neck (arrows F1, F2, F3, F4).

The distance between the recessed surfaces 15 of the two parts 10, 20, the distance between the recessed surfaces 16 of the two parts 10, 20, the distance between the recesses 17a, 17b of the two parts 10, 20 and the distance between the recesses 18a, 18b of the two parts 10, 20 preferably are each in a range from 0.2 to 2.5 mm.

The distance, in particular the minimum distance, between surface 11 and surface 21 and between surface 12 and surface 22 preferably is in a range from 0.01 mm to 0.1 mm, preferably from 0.02 mm to 0.06 mm, said distance preferably being constant or substantially constant.

This range allows the gases or vapors to leave and prevents thermoplastic material from leaving.

At least one of surface 11, surface 12, surface 21 and surface 22 is provided with LIPSSs, preferably with a plurality of crests 101 and a plurality of channels 102 (FIGS. 5 to 7C).

For example, all the surfaces 11, 12, 21, 22 can be provided with a plurality of crests 101 and a plurality of channels 102; or for example, only surfaces 11, 12 of part 10 can be provided with crests 101 and channels 102, or other combinations.

Advantageously, the plurality of crests 101 and channels 102 significantly reduces the deposit of dirt on the respective surface of which the wettability is, in particular, decreased. Advantageously, the presence of the LIPSSs does not substantially alter the section through which the gases and vapors pass, in particular at the micrometric level.

In addition to the vent passageways which were described, the mold may optionally also comprise further vent passageways.

Figure 4C:
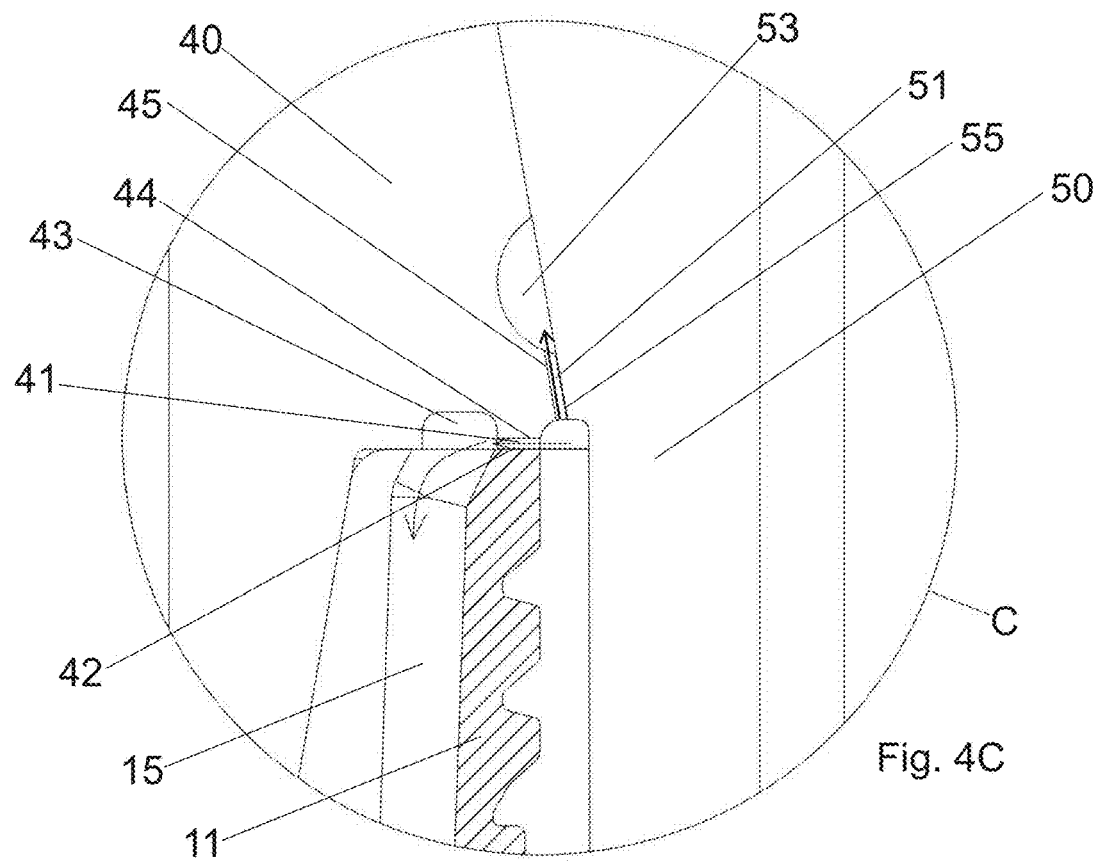
FIG. 4C shows an enlarged detail of FIG. 4.
Figure 4B:
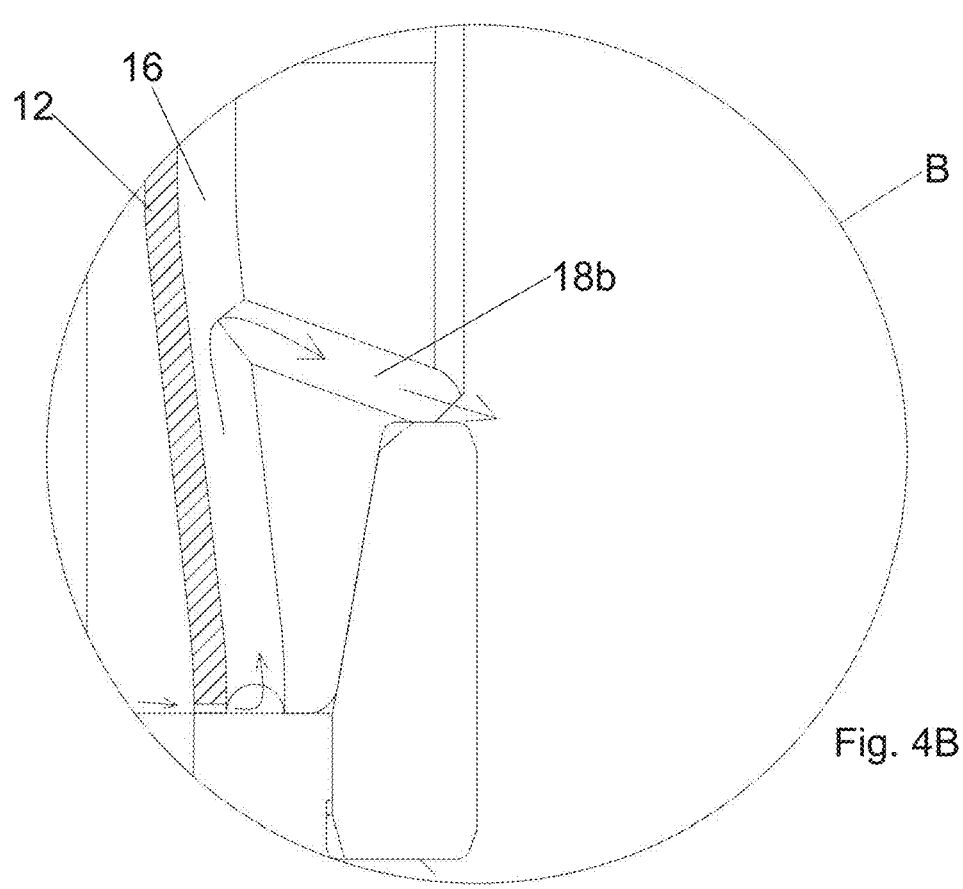
FIG. 4B shows an enlarged detail of FIG. 4.

For example, with particular reference to FIGS. 4 and 4C, a passageway 41 may be provided, preferably an annular passageway about axis X, for gases or vapors, delimited by a portion 42 (FIG. 1A) of the upper surface of part 10 and/or of part 20 and by the component of the mold which is known in the field as core holder 40.

Preferably, the aforesaid portion 42 is an annular portion and faces, and is spaced apart from, a surface 44 of the core holder 40.

At least one, for example both, of the aforesaid portion of surface 42 and surface 44 of the core holder 40 may optionally be provided with LIPSSs, for example with a plurality of crests 101 and a plurality of channels 102.

The distance, in particular the minimum distance, between the portion of surface 42 and surface 44 preferably is in a range from 0.01 to 0.1 mm.

The portion of surface 42 and surface 44 are not intended to come into contact with the thermoplastic material.

Passageway 41 leads into a channel 43, preferably an annular channel about axis X, which in turn communicates with the recessed surface 15 and/or with the recessed surface 16.

A further passageway 51, preferably an annular passageway, which may optionally be provided, is delimited by the core holder 40 and by the component which in the field is known as core 50, or elongated core, which has a portion adapted to mold the inner surface of the preform.

In particular, passageway 51 is delimited by the portion of surface 45 of the core holder 40 and by the portion of surface 55 of core 50, which face and are spaced apart from each other.

The distance, in particular the minimum distance, between the portions of surface 45, 55 preferably is in a range from 0.01 mm to 0.1 mm.

The portions of surfaces 45, 55 are not intended to come into contact with the thermoplastic material.

Preferably, at least one, for example both, of the portion of surface 45 of the core holder 40, and the portion of surface 55 of core 50 is provided with LIPSSs, for example with a plurality of crests 101 and a plurality of channels 102.

Passageway 51 communicates with another passageway 53 which leads outside the mold.

For all surfaces on which they are provided, the LIPSSs preferably comprise or are formed by said plurality of crests 101 and said plurality of channels 102.

The whole surface or one or more parts of said surfaces may be provided with said LIPSSs, for example with said plurality of crests 101 and channels 102.

Figure 5:
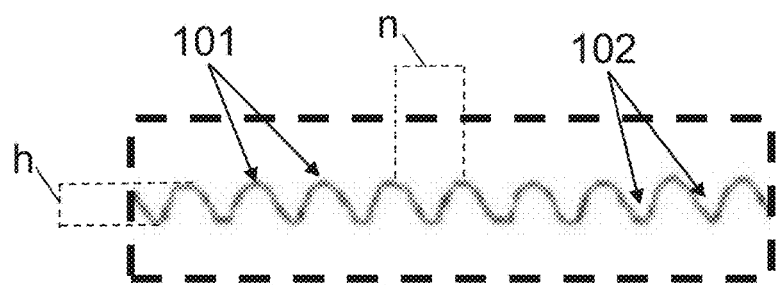
FIG. 5 shows the profile of an example of LIPSSs.

FIGS. 7A and 7C show a top plan view of two examples of the aspect of the LIPSSs. FIG. 5 depicts a profile of an example of LIPSSs, and FIG. 6 shows the profile of another example of LIPSSs, such a profile being obtained by means of an atomic force microscope (AFM).

Figure 6:
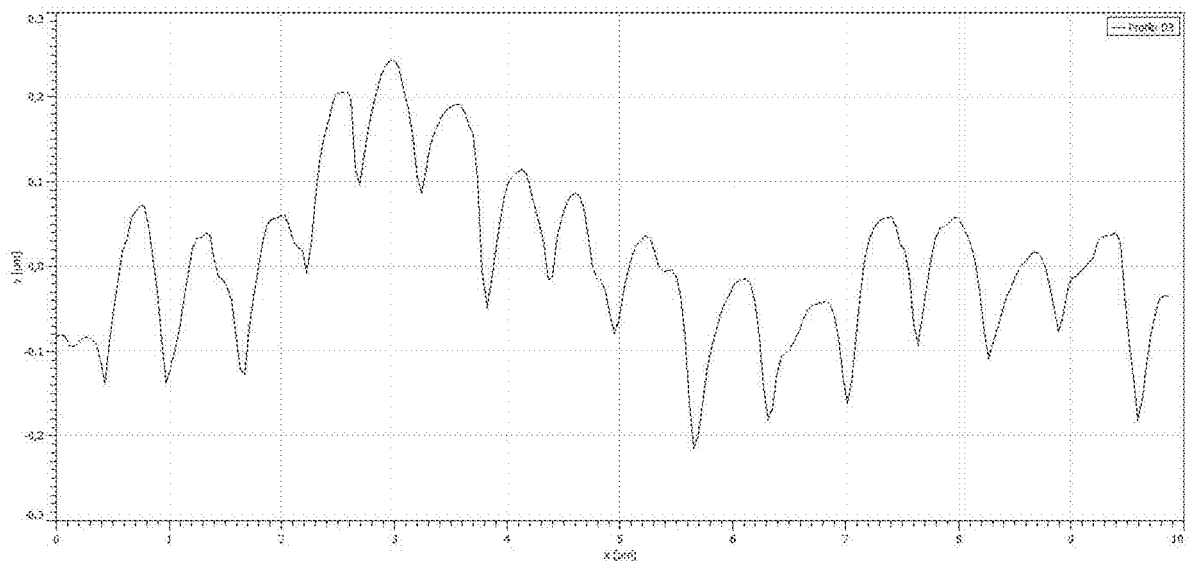
FIG. 6 shows the profile of another example of LIPSSs, such a profile being obtained by means of an atomic force microscope (AFM)

In particular, the profiles in FIGS. 5 and 6 are the profiles on a plane perpendicular to the orientation direction of the LIPSSs (also referred to as the first direction for descriptive purposes).

Said plurality of crests 101 and said plurality of channels 102 are preferably substantially oriented in the same first direction.

Said first direction is preferably transverse, preferably orthogonal, to the axis about which the molding surface 13, 23 of the component extends.

In particular, it is preferable that the first direction is substantially parallel to the direction of the flow of gases or vapors leaving the mold. For example, said first direction is substantially parallel to the arrows F in FIG. 4A, which are representative of the direction of the flow of gases or vapors.

The crests 101 are alternated by channels 102, or at least most of the crests 101 are alternated by the channels 102.

The crests 101 and the channels 102 are substantially parallel to one another, or in other words, are substantially, or mainly, oriented longitudinally along the same direction, i.e. the aforesaid first direction.

The crests 101 and the channels 102 are substantially rectilinear or may substantially be wavy lines along the first direction.

The length of the crests 101 and of the channels 102 along the first direction is much greater with respect to the height "h" thereof and the width thereof.

The crests 101 protrude with respect to the channels 102. In particular, the height of the crests 101 is in a range from 100 to 500 nm, or from 100 to 350 nm, said height preferably having a constant value with a tolerance of ±50 nm.

Such a height is the distance between the bottom of the channels 102 and the top of the crests 101.

When the LIPSSs have a different shape with respect to the crests and channels, such a height is preferably measured from the bottom of the surface from which the LIPSSs extend.

Preferably, but not exclusively, the top of the crests 101 is curved, for example rounded, a feature which increases the hydrophobicity (lesser wettability) of the surface.

Period "n" between the crests 101 of said plurality of crests, is less than 1000 nm, preferably in a range from 300 to 1000 nm, or from 400 to 900 nm, or from 500 to 800 nm, or from 600 to 700 nm. Said period n preferably has a constant value with a tolerance of ±50 nm.

Preferably, period "n" substantially corresponds to the pitch of the crests 101, which is the distance between corresponding or substantially corresponding points of two consecutive crests 101 along a second direction which is substantially perpendicular to the first direction.

Preferably, but not exclusively, the average roughness of the ground surface on which the LIPSSs may be produced is between 0.30 and 0.35 µm.

Such an average roughness is also indicated in the field as "Sa".

The features of the LIPSSs may be measured for example, by means of an optical profilometer preferably in confocal mode; and/or by means of a scanning electron microscope (SEM); and/or by means of an atomic force microscope (AFM).

Preferably, but not exclusively, the average values of the dispersion of the angle of orientation with respect to the first direction, are between 0 and 45°, preferably between 0 and 30°, more preferably between 0 and 26°.

Preferably, but not exclusively, the LIPSSs are low spatial frequency LIPSSs (also referred to as LSFLs). In particular, the low spatial frequency LIPSSs have a pitch "n" which is less than the wavelength A of the laser with which they are generated. Typically, but not exclusively, such a pitch "n" is between $\lambda/2$ and $\lambda$.

Preferably, but not exclusively, the laser wavelength is between 500 and 1100 nm. According to an aspect, the invention comprises a process for obtaining a component having at least one surface provided with the LIPSSs, for example crests 101 and channels 102, the process comprising at least the step of irradiating at least one surface of at least one part 10, 20 of the component by means of a laser beam emitted by a laser source for producing said LIPSSs, for example said plurality of crests 101 and said plurality of channels 102.

Preferably, but not exclusively, the aforesaid process is a non-linear laser lithography process. Preferably, the laser beam is pulsating, with pulses having a duration with a value in a range from 1 to 10 ps, preferably from 7 to 9 ps.

Preferably, but not exclusively, the laser power has a value in a range from 16 to 22 W.

Preferably, but not exclusively, the pulse energy is between 16 and 22 µJ.

Preferably, but not exclusively, the frequency of the laser is in a range from 200 kHz to 1 MHz, preferably is of about 1 MHz.

Preferably, but not exclusively, the surface is first ground and then irradiated.

Preferably, the grinding direction is parallel to the orientation direction of the crests 101 and of the channels 102.

An apparatus comprising a laser source and a deflector is used to carry out the process.

Means for focusing the laser beam are preferably provided upstream of the head which emits the laser beam.

During the process, the deflector may conveniently move to irradiate the part, or the parts, of the component where the LIPSSs are to be provided.

The part comprising the surface on which the LIPSSs are to be provided is preferably arranged on a moving table adapted to move with respect to a head from which a laser beam leaves.

Typically, but not exclusively, the orientation direction of the crests is correlated with the polarization direction of the laser. Typically, but not exclusively, the lying of the polarization plane is oriented so as to obtain the suitable preferential orientation direction of the crests.

In particular, the crests 101 are preferably substantially oriented orthogonally to the polarization direction of the laser light. Moreover, preferably but not exclusively, the crests 101 are oriented orthogonally to the scanning direction of the laser, the polarization direction of the light being substantially parallel to the scanning direction.

By mere way of non-limiting example, the process may be carried out by means of a "Coherent HyperRapid NX" laser source, operating at a fundamental mode at 1064 nm with pulse duration of about 8 ps.

The deflector may be a "Raylase Focusshifter CS" scanner for example, provided with a lens with 160 mm focal length.

Preferably, but not exclusively, the diameter of the spot of the laser beam is about 30 µm.

The following table shows the process parameters of two different processes, No. 1 and No. 2, respectively, which are indicated by way of non-limiting example.

|  | No. 1 | No. 2 |
|---|---|---|
| Laser power [W] | 16 | 20 or 22 |
| Pulse energy [µJ] | 16 | 20 or 22 |
| Laser pulse duration [ps] | ≈8 | ≈8 |
| Laser frequency [MHz] | 1 | 1 |
| Scanning speed [mm/s] | 2500 | 2500 |
| Distance between the scanning lines [µm] | 10 | 10 |

Preferably, but not exclusively the laser wavelength is between 500 and 1100 nm.

Preferably, the laser is capable of generating periodic structures induced with shorter period than the wavelength of the laser itself.

According to an aspect, the invention relates to a mold for molding preforms made of thermoplastic material, comprising at least one component having one or more of the features described above.

Although the present description was made with main reference to the LIPSSs which comprise or consist of crests and channels, the LIPSSs may also have other shape. For example, the LIPSSs may comprise or consist of a plurality of pillars, or comprise or consist of a plurality of scales, or comprise or consist of two or more, for example two or three, of the shapes mentioned above, i.e. crests, pillars and scales.

The invention claimed is:

1. A component of a mold for molding preforms made of thermoplastic material, wherein said component is configured to mold an outer surface of a neck of a preform and comprises:
    a first part and a second part each having a respective molding surface adapted to mold part of the outer surface of the neck of the preform,
    wherein when the first part and the second part are assembled to each other, a first surface of the first part and a second surface of the second part face each other and are spaced apart from each other, the entire first surface and the entire second surface thus delimiting a first passage for gases or vapors to leave the mold;
    wherein the whole first surface and the whole second surface are provided with laser-induced periodic surface structures (LIPSSs);
    wherein the first part comprises a third surface and the second part comprises a fourth surface;
    wherein, when the first part and the second part are assembled to each other, said third surface and said fourth surface face each other and are spaced apart from each other, the entire third surface and the entire fourth surface thus delimiting a second passage for gases or vapors to leave the mold;
    wherein the whole third surface and the whole fourth surface are provided with laser-induced periodic surface structures (LIPSSs);

wherein the first surface, the second surface, the third surface and the fourth surface define an entire parting surface between the first part and the second part of said component;

wherein a height of said laser-induced periodic structures is in a range from 100 to 500 nm; and wherein a period between said laser-induced periodic structures is less than 1000 nm.

2. The component according to claim 1, wherein said laser-induced periodic surface structures (LIPSSs) comprise a plurality of crests and a plurality of channels.

3. The component according to claim 2, wherein said plurality of crests and said plurality of channels are oriented substantially in a same direction.

4. The component according to claim 3, wherein said direction is orthogonal to an axis about which a molding surface of the component extends.

5. The component according to claim 1, wherein a distance between said first surface and said second surface is in a range from 0.01 to 0.1 mm.

6. The component according to claim 5, wherein said distance between said first surface and said second surface is in a range from 0.02 mm to 0.06 mm.

7. A mold for preforms comprising a component according to claim 1.

8. The mold according to claim 7, comprising a core holder, wherein, when the core holder is assembled with the first part and the second part, a third passage for gases or vapors to leave the mold is provided between the core holder and the first part and between the core holder and the second part, said third passage being delimited by a fifth surface of the core holder, by a sixth surface of the first part, and by a seventh surface of the second part, and wherein at least one of said fifth surface, said sixth surface and said seventh surface is provided with laser-induced periodic surface structures (LIPSSs).

9. The mold according to claim 8, comprising a core, wherein, when the core holder is assembled with the core, a fourth passage for gases or vapors to leave the mold is provided between the core holder and the core, said fourth passage being delimited by an eighth surface of the core holder and by a ninth surface of the core, and wherein at least one of said eighth surface and said ninth surface is provided with laser-induced periodic surface structures (LIPSSs).

10. A component according to claim 1, wherein each of said first surface and said second surface comprises laser-induced periodic surface structures (LIPSSs) that minimize deposit of material.

* * * * *